United States Patent
Winsor

(10) Patent No.: US 11,232,787 B2
(45) Date of Patent: Jan. 25, 2022

(54) MEDIA COMPOSITION WITH PHONETIC MATCHING AND WAVEFORM ALIGNMENT

(71) Applicant: Avid Technology, Inc., Burlington, MA (US)

(72) Inventor: Christopher M. Winsor, Oakley, CA (US)

(73) Assignee: AVID TECHNOLOGY, INC, Burlington, MA (US)

(*) Notice: Subject to any disclaimer, the term of this patent is extended or adjusted under 35 U.S.C. 154(b) by 142 days.

(21) Appl. No.: 16/789,488

(22) Filed: Feb. 13, 2020

(65) Prior Publication Data
US 2021/0256968 A1 Aug. 19, 2021

(51) Int. Cl.
*G10L 15/187* (2013.01)
*G10L 15/02* (2006.01)
*G06F 16/61* (2019.01)
*G06F 16/683* (2019.01)

(52) U.S. Cl.
CPC ............ *G10L 15/187* (2013.01); *G06F 16/61* (2019.01); *G06F 16/683* (2019.01); *G10L 15/02* (2013.01); *G10L 2015/025* (2013.01)

(58) Field of Classification Search
CPC . G10L 15/187; G10L 15/02; G10L 2015/025; G10L 15/08; G10L 2015/223; G10L 15/20; G10L 15/005; G10L 15/24; G10L 19/0018; G10L 15/00; G06F 16/61; G06F 16/683; G06F 16/685; G06F 3/167; G06F 16/41; G06F 16/433; G06F 16/3344; G06F 40/263; G06F 16/3343; G11B 27/031
See application file for complete search history.

(56) References Cited

U.S. PATENT DOCUMENTS

| 2012/0059656 | A1* | 3/2012 | Garland | G10L 25/00 704/254 |
| --- | --- | --- | --- | --- |
| 2016/0284345 | A1* | 9/2016 | Ji | G10L 15/08 |
| 2018/0277132 | A1* | 9/2018 | LeVoit | G10L 15/26 |
| 2019/0363689 | A1* | 11/2019 | Eppolito | G06F 3/01 |
| 2020/0042279 | A1* | 2/2020 | Rubin | G11B 27/34 |
| 2020/0082837 | A1* | 3/2020 | Georges | G10L 15/02 |
| 2021/0065679 | A1* | 3/2021 | Finlay | G06F 16/685 |

OTHER PUBLICATIONS

Avid's Phrasefind & AV3's GET, www.postmagazine.com/Publications/Post-Magazine/2011/May-1-2011/Review-Avids-Phrasefind-AV3s-GET.aspx, May 1, 2011, 6 pages.
(Continued)

*Primary Examiner* — Linda Wong
(74) *Attorney, Agent, or Firm* — Oliver Strimpel

(57) ABSTRACT

When a portion of an original audio track is unsatisfactory, alternate portions are searched for using phonetic matching within phonetically indexed alternate files. The alternates may correspond to recordings captured in a different take from the original where timecode matching is unavailable. An editor may preview one or more candidate alternates and select a preferred one to be used to replace the original. A media editing application, such as a digital audio workstation, automatically aligns and matches the preferred alternative to the original using waveform matching and optional gain matching.

16 Claims, 7 Drawing Sheets

(56) References Cited

OTHER PUBLICATIONS

Avid ScriptSync: An Editor's Secret Weapon, Chris Bové, ProVideo Coalition, May 14, 2017, 24 pages.
Synchro Arts Revoice Pro 4, Pitch & Time Alignment Software, https://www.soundonsound.com/reviews/synchro-arts-revoice-pro-4 5, published Apr. 2019, 6 pages.
Use Avid's Group by Waveform Function for AutoSync, 24p.com/wordpress, Dec. 23, 2017, 6 pages.
Using DaVinci Resolve's Waveform Sync with Avid's Media Composer AutoSync, 24p.com/wordpress/?cat=3, Nov. 11, 2017, 9 pages.
VocAlign Pro 4 Review, Sara Simms, https://ask.audio/articles/review-vocalign-pro-4 1, Sep. 20, 2016, 5 pages.

* cited by examiner

MEDIA COMPOSITION WITH PHONETIC MATCHING AND WAVEFORM ALIGNMENT

BACKGROUND

During the production of film and television programs, many hours of on-set dialog are recorded. These may include multiple channels of audio, in a single or in multiple files, recorded during the same take by various microphones positioned on performers and around an indoor or outdoor shooting location. A given scene is usually shot many times until a satisfactory take is captured, with each take having its own set of audio channels. In a typical workflow, editors use portions captured during more than one take in order to obtain the highest quality finished version. In order to be able to use channels from multiple takes, appropriate metadata is needed to link and synchronize the channels. However, such metadata is not always present, either because it was never there to begin with, or because it was stripped out by an application deployed during the post-production process. Timecode based on the time-of-day is often used to synchronize recordings belonging to a given take, but this method is not applicable between takes since they are recorded at different times, which makes it difficult to locate and synchronize alternate dialog recordings between different takes. Editors are often left with no option but to perform a time-consuming search through a folder of files that may or may not have names that assist in identifying desired content. The editors must then manually select the files to be imported into their media editing application, place them on the timeline of the project, and search for the portions of the files containing the desired alternate dialog.

A similar challenge arises during music editing workflows. Editors often need to mix channels of audio from within a given file or portions of those audio channels that were recorded in different takes. In many professional recording environments, there may be hundreds of audio channels involved in creating a given composition. Finding the appropriate channel within a file that contains the desired material, as well as locating the appropriate temporal ranges within the clips on the tracks can be laborious.

There is therefore a need for methods and systems to help audio editors during video post-production or audio production to use audio material recorded in more than one take.

SUMMARY

In general, methods for replacing an unsatisfactory portion of an audio file with an alternate identify candidate portions for replacing the unsatisfactory portion using phonetic searching of alternate recordings captured both in the same take and in different takes. A preferred candidate is automatically aligned and matched using waveform matching, optionally with time warping and gain matching.

In general, in a first aspect, a method of editing an audio composition using an audio editing application includes: receiving a first audio file that includes a first recording of speech that is indexed by a first phonetic index; receiving a second audio file that includes a second recording of speech that is indexed by a second phonetic index; and in response to a user of the audio editing application specifying a portion of the first audio file that is to be replaced, the audio editing application automatically: using the first phonetic index to identify a phoneme sequence corresponding to the specified portion of the first audio file; searching the second phonetic index for an occurrence of the phoneme sequence in the second phonetic index; and in response to locating an occurrence of the phoneme sequence in the second phonetic index: identifying a matching portion of the second audio file corresponding to the located occurrence of the phoneme sequence; and in response to the user of the audio editing application selecting the matching portion of the second audio file: temporally aligning the matching portion of the second audio file with the specified portion of the first audio file by matching a waveform of the matching portion of the second audio file with a waveform of the specified portion of the first audio file; and replacing the specified portion of the first audio file with the temporally aligned matching portion of the second audio file.

Various embodiments include one or more of the following features. Matching the waveform of the matching portion of the second audio file with the waveform of the specified portion of the first audio file includes one or both of: time-stretching the waveform of the matching portion of the second audio file; and adjusting a gain of the waveform of the matching portion of the second audio file. The first recording and the second recording were captured during a given take. The second recording was captured in a different take from the first recording. The first recording was captured on a film set and the second recording was captured in a recording studio. Automatically aligning the matching portion of the second audio file with the specified portion of the first audio file by adjusting a temporal offset of the matching portion of the second track so that a feature of a waveform of the matching portion of the second audio track is aligned with a corresponding feature of a waveform of the specified portion of the first audio file. The feature of the waveform corresponds to a beginning of an utterance or a beginning of sung phrase. Automatically stretching or shrinking at least a part of the matching portion of the second audio file so as to temporally align a plurality of features of a waveform of the matching portion with a corresponding plurality of features of a waveform of the specified portion of the first audio file.

In general, in another aspect, a method of editing an audio composition using an audio editing application includes: receiving a first audio file that includes a recording of speech; receiving a second audio file that includes a second recording of speech that is indexed by a phonetic index; and in response to a user of the audio editing application specifying a text string representing speech contained within a portion of the first audio file that is to be replaced, the audio editing application automatically: converting the text string into a corresponding phoneme sequence; searching the phonetic index of the second audio file for an occurrence of the phoneme sequence; and in response to locating an occurrence of the phoneme sequence in the phonetic index: identifying a matching portion of the second audio file corresponding to the located occurrence of the phoneme sequence; and in response to the user of the audio editing application selecting the matching portion of the second audio file: enabling the user to align the matching portion of the second audio file with; and replacing the portion of the first audio file that is to be replaced with the temporally aligned matching portion of the second audio file.

Various embodiments include one or more of the following features. Adjusting the gain of the portion of the second audio track to match a gain of the portion of the first audio track. An average gain of the portion of the second audio track is matched to an average gain of the portion of the first audio track. The gain of a feature of a waveform of the second audio track is matched to a corresponding feature of a waveform of the first audio track.

In general, in a further aspect, a computer program product includes: a non-transitory computer-readable medium with computer-readable instructions encoded thereon, wherein the computer-readable instructions, when processed by a processing device instruct the processing device to perform a method of editing an audio composition using an audio editing application, the method comprising: receiving a first audio file that includes a first recording of speech that is indexed by a first phonetic index; receiving a second audio file that includes a second recording of speech that is indexed by a second phonetic index; and in response to a user of the audio editing application specifying a portion of the first audio file that is to be replaced, the audio editing application automatically: using the first phonetic index to identify a phoneme sequence corresponding to the specified portion of the first audio file; searching the second phonetic index for an occurrence of the phoneme sequence in the second phonetic index; and in response to locating an occurrence of the phoneme sequence in the second phonetic index: identifying a matching portion of the second audio file corresponding to the located occurrence of the phoneme sequence; and in response to the user of the audio editing application selecting the matching portion of the second audio file: temporally aligning the matching portion of the second audio file with the specified portion of the first audio file by matching a waveform of the matching portion of the second audio file with a waveform of the specified portion of the first audio file; and replacing the specified portion of the first audio file with the temporally aligned matching portion of the second audio file.

DETAILED DESCRIPTION

The linear nature of time-based media makes it time-consuming to search for desired content within the media by playing it back and watching and/or listening for the content. One method of accelerating the search is to enable a segment of media to be located by random access search methods similar to those familiar in text-based searches. This can be achieved when an audio track of a video composition includes speech and the audio track is indexed phonetically. Phonetic indexing determines the phonemes that correspond to the speech and maintains temporal synchronicity of the phonemes with the audio rendering of the corresponding speech, essentially creating a synchronized phonetic track. Phonetic indexing may also be performed for speech that is sung, i.e., for the lyrics in a musical production.

Channels of audio files that have been phonetically indexed may be searched for spoken words without the need to play back the audio track. To perform a search, a user of a media editing application specifies text that is to be searched. The search text is converted into a phoneme sequence, and the phonetic index of the audio material is searched for this phoneme sequence. Alternatively, the editor may use voice input corresponding to the text to be searched for, and the voice input is converted into the phoneme sequence to be searched. The occurrences of the phoneme sequence in the media's phonetic index correspond to portions of the audio that enunciate the text represented by the searched phoneme sequence. Tools for searching media based on spoken words are available for various video editing tools, such as PhraseFind for Media Composer®, a video editing application available from Avid® Technology, Inc., of Burlington, Mass.

We describe methods of automating various steps involved in editing time-based media in which an editor wishes to replace an existing audio portion within a media composition with an alternate portion. The methods involve the use of phonetic indexing within the context of digital audio editing using a digital audio workstation, such as Pro Tools®, available from Avid Technology, Inc. As used herein, a track refers to a container in a digital audio workstation that houses clips of audio data for the purpose of editing and playing back the clips. A clip refers to a portion of an audio file defined by the temporal location and duration of the clip within the file and the channel(s) within the file. An audio channel refers to a single mono stream of audio data within an audio file. An audio file may include one or more channels of audio.

Figure 1:
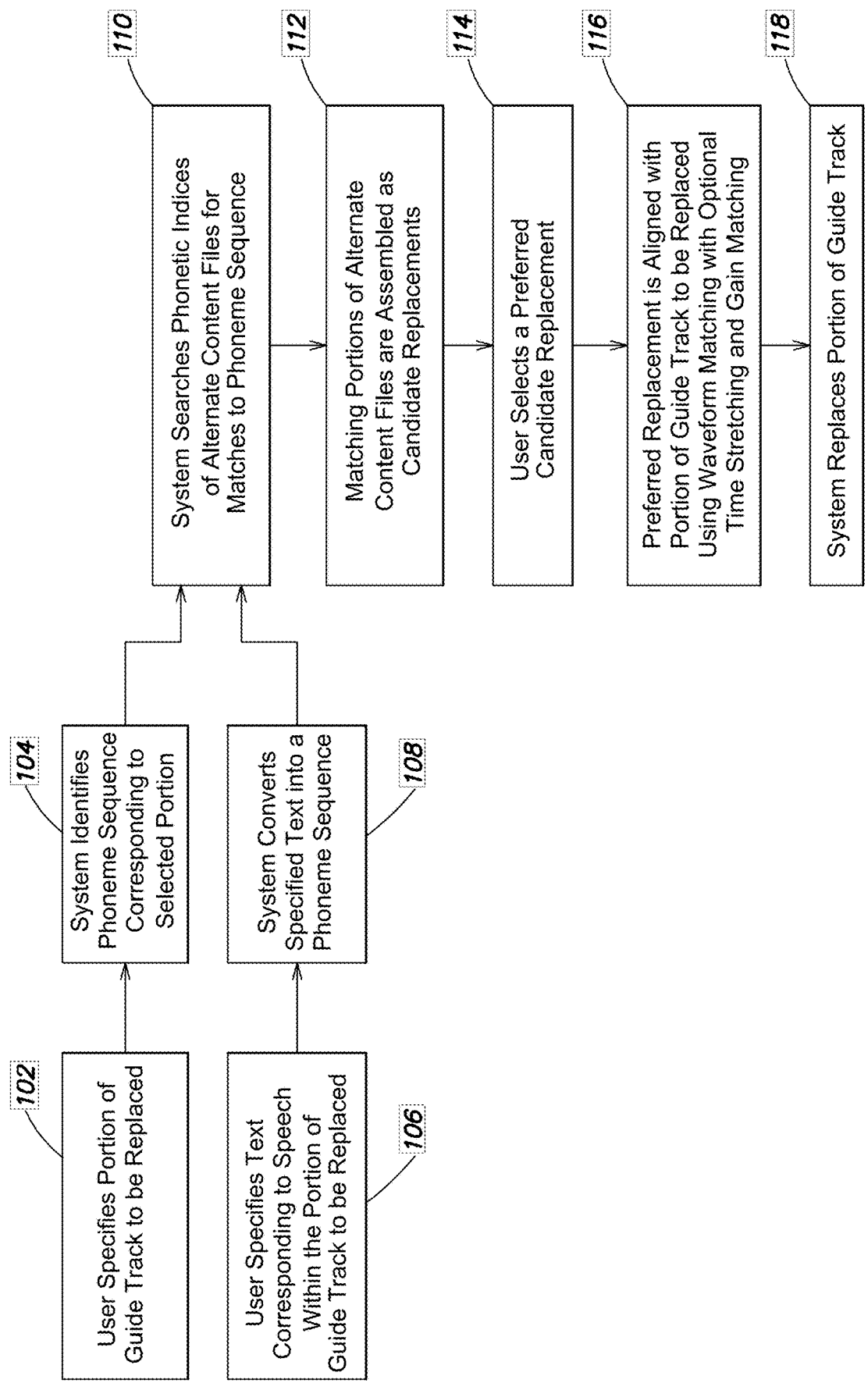
FIG. 1 is a high-level workflow for automatic replacement of a portion of dialog audio with an alternate located by phonetic searching.

FIG. 1 is a high-level block diagram of two workflows for automated audio replacement in which a guide track containing a portion to be replaced as well as one or more alternate content files have been phonetically indexed. A phonetic index of an audio file is an ordered list of phonemes, each of which is associated with the temporal offset within an audio file at which it occurs in spoken dialog or song. In a typical scenario, there are multiple takes of a given audio content. The editor establishes one of the takes as an original, which, in the case of audio content of a film or video composition is to serve as the guide track. When listening to the guide track, the editor detects a portion of the guide track where the audio has problems, and where it would be desirable to substitute in a better alternative. The user specifies 102 the problem portion of the guide track that is to be replaced. Typically, the user does this by selecting the portion within the timeline of a digital audio workstation, thus specifying precise locations within the guide track of the start point and end point of the portion to be replaced. The system then uses the guide track's phonetic index to identify 104 the phoneme sequence corresponding to the specified portion. This workflow is advantageous when the editor seeks to find a replacement portion to replace the original portion "in place."

In an alternate workflow, the portion to be replaced may be identified by specifying 106 the text that is rendered by the guide track portion to be replaced. In general, the editor specifies the text by direct text input to a system hosting the media editing application. In some implementations, the text is provided by voice input to the system. The text is converted 108 into the phoneme sequence using a text-to-phoneme converter. For text defined by speech input, a speech-to-phoneme converter may be used to convert the speech into the phoneme sequence. The text entry workflow may be advantageous when audio is faint, garbled, drowned or otherwise unintelligible in the guide track portion to be replaced, causing gaps or inaccuracies in the phoneme index. However, the editor may know what the text should have been, for example from a transcript, or from an alternate file. This text may then be used to search for alternates. The text workflow may also be useful when searching for a replacement portion that need not be placed at a precise location within the guide track.

Once the phoneme sequence corresponding to the portion to be replaced is determined, the two workflows converge. The system automatically searches 110 for occurrences of the phoneme sequence in the phonetic indices of the available media. The search includes files that have already been imported into an audio editing session. In typical digital audio workstation applications, such files reside in a clip list. Clips that are already placed on the timeline of the composition being edited may also be searched. In various implementations, when the audio session is being set up, the user specifies one or more disk locations where indexed media files are stored. The indexed media may be searched phonetically, as well as by the traditional timecode and descriptive metadata. When the user initiates a search for replacement media, the media in these indexed locations may be automatically searched, along with the media already within the session. The search may include alternate recordings from the same take as that of the guide track, for example those captured by different microphones. Alternate recordings captured in different takes may also be searched. The ability of phonetic search to search channels of audio files captured in different takes is especially valuable, since these files are not searchable using traditional methods that rely on timecode. The search results may include exact matches with the searched phoneme sequence, and optionally also partial matches.

Figure 2:
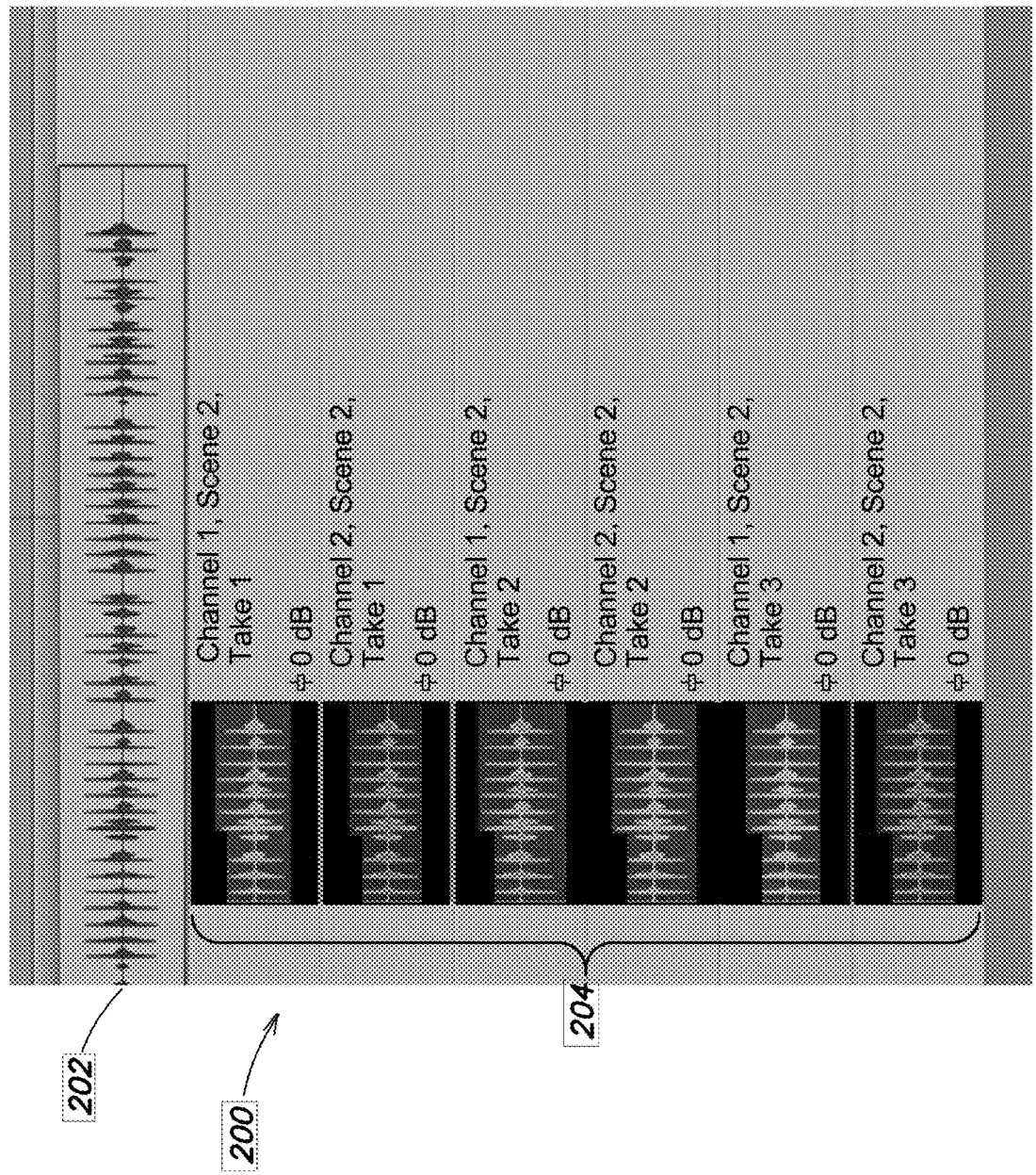
FIG. 2 is a diagrammatic illustration of a digital audio workstation timeline showing audio waveforms of an audio guide track with separate audio channels showing waveforms of candidate replacement portions identified by phonetic searching.
Figure 3:
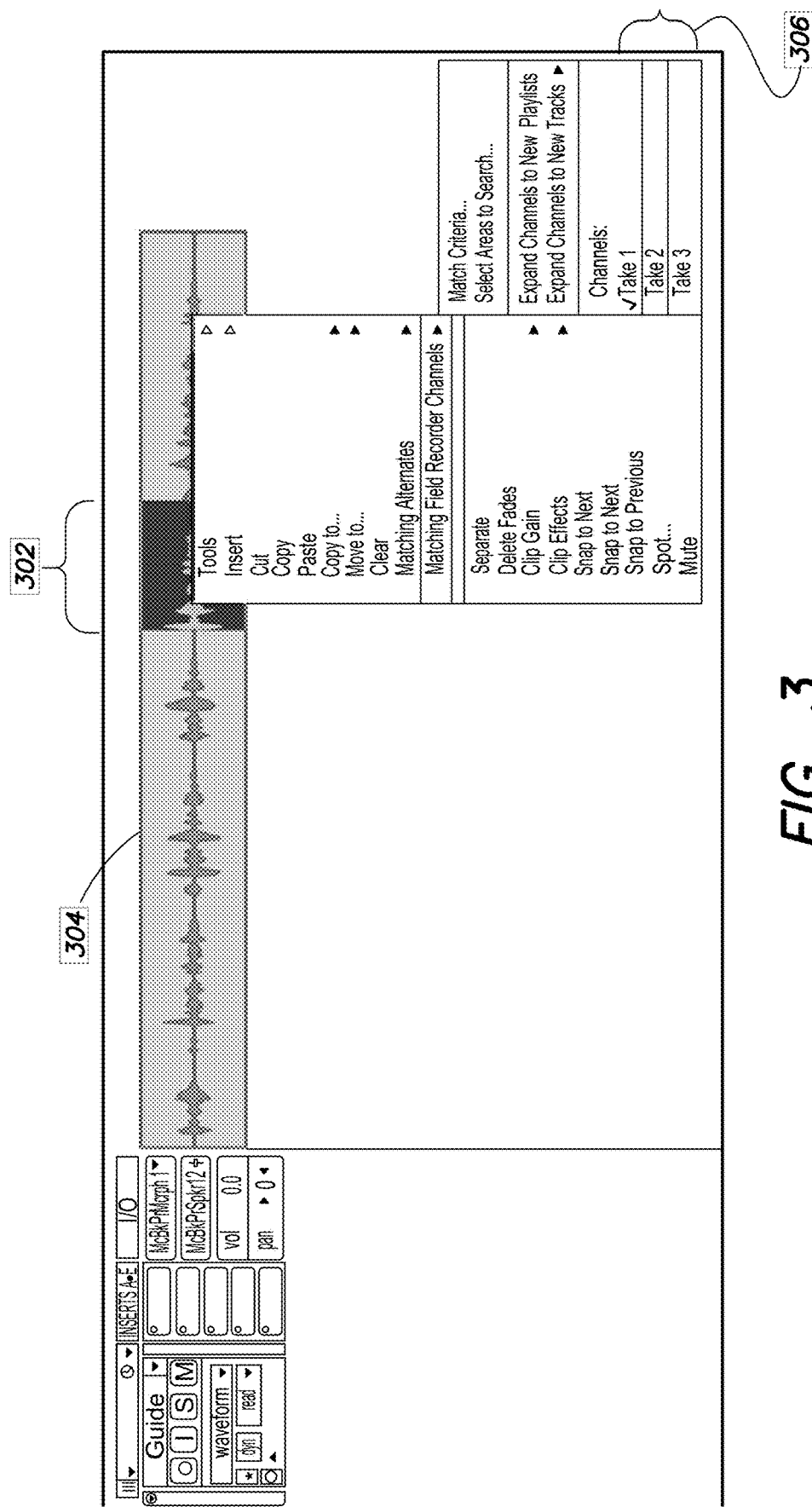
FIG. 3 is a diagrammatic illustration of a digital audio workstation timeline showing a list of alternates for a specified portion of a guide track obtained from phonetic searches of different takes.

The search results may be ranked by the quality of the match, with an option to limit the display of results to those clips whose phoneme sequence matches the searched phoneme sequence above a pre-defined threshold degree of match. If more than a single match is found, the system assembles 112 the matching portions of the alternate content files as candidate replacements. FIG. 2 is a diagrammatic screenshot 200 of a DAW timeline, showing the waveform of original guide track 202 with waveforms of each of six candidate replacement portions 204 shown on separate tracks in approximate alignment with the portion to be replaced. The timeline may also include other tracks representing a composition's video, special effects, and computer graphics, which are not shown. Alternatively, each of the candidate replacement portions may be shown in a list, using an interface such as that illustrated in FIG. 3, in which a user identifies the problem portion 302 of guide track 304, e.g., by using a mouse and clicking the right-hand button, which causes list of alternates 306 to be displayed.

Figure 4:
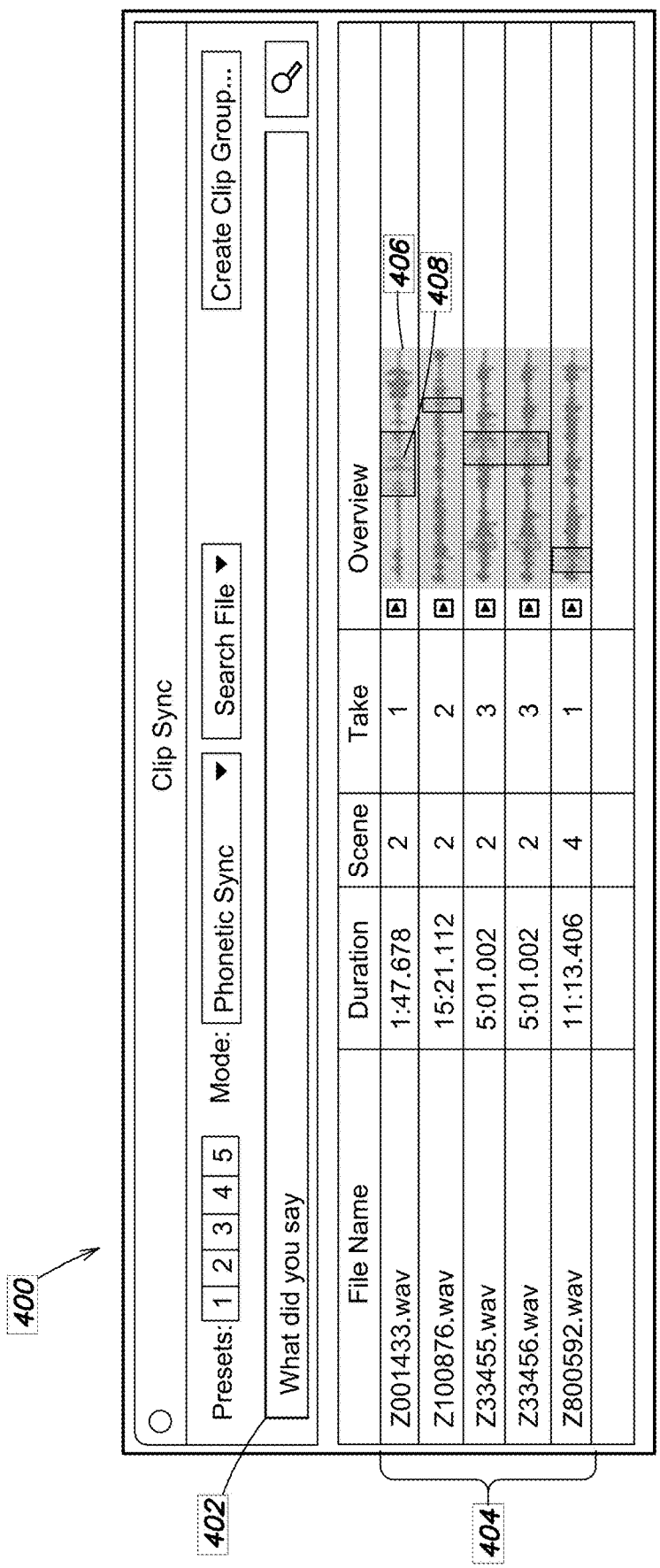
FIG. 4 is a diagrammatic illustration of a window of a digital audio workstation application showing a listing of candidate dialog replacement clips identified by searching for phonemes corresponding to a text search string.

FIG. 4 illustrates a display of candidate replacements resulting from the text search workflow. Text search box 402 shows the search text entered by the user and is followed by list 404 of clips containing matching phoneme sequences. A portion of each clip's waveform 406 that includes the portion corresponding to the phonetic matches is shown, with the phonetically matched portion 408 highlighted. The window optionally includes metadata about each of the candidate files, such as duration, scene, and take.

The editor uses some or all of audio preview, waveform appearance, clip name, and metadata of the candidate replacement clips to select 114 a preferred clip. Once the user selects a clip, the replacement process proceeds automatically as described next.

Figure 5:
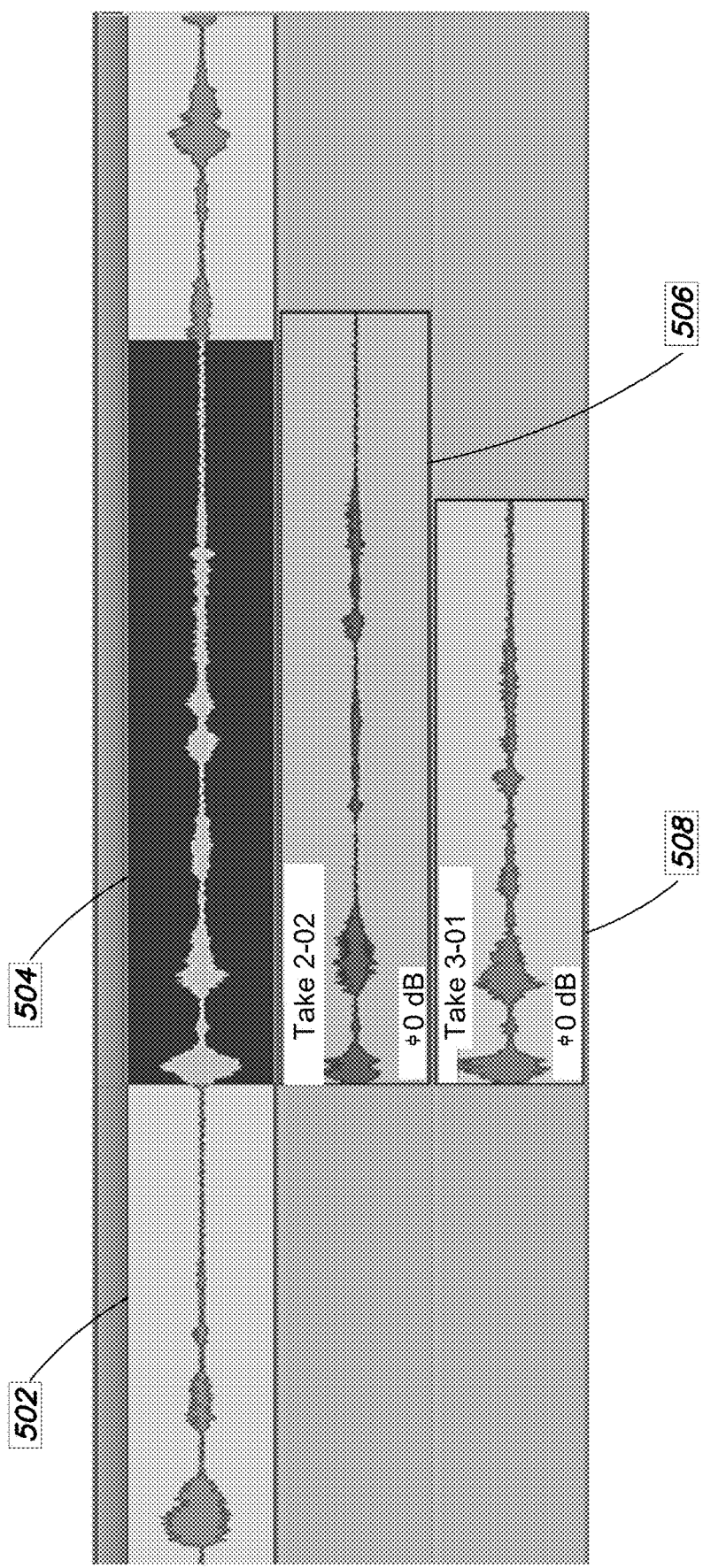
FIG. 5 is a diagrammatic illustration of a digital audio workstation timeline showing rough alignment of portions of alternate audio identified by phonetic searching.
Figure 6:
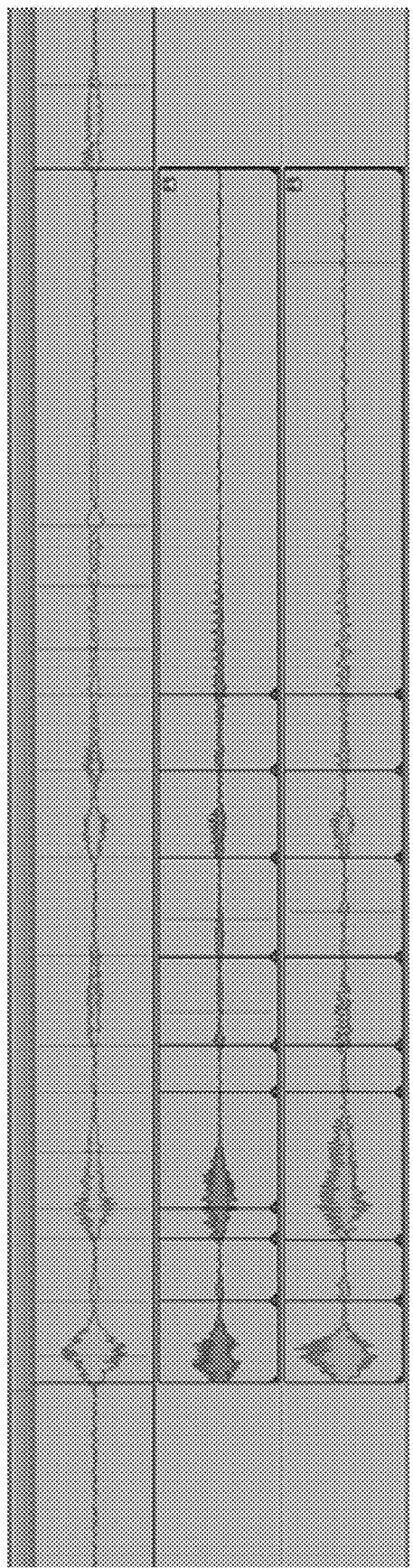
FIG. 6 is a diagrammatic illustration of a digital audio workstation timeline showing alignment of waveform features within the body of replacement audio portions.

The phonetic matching provides alternates that correspond only roughly to the location and duration of the portion to be replaced, as illustrated in FIG. 5, which shows guide track 502 with portion to be replaced 504 and alternates 506 and 508 located by phonetic searching. As shown diagrammatically in the figure, the waveforms show features that correspond to each other, but the length of the alternates and the timing and shape of the transient elements of the waveforms do not match. When a preferred candidate replacement segment is selected by the user, a waveform matching process 116 is used to align the replacement segment with the portion of the original track to be replaced. In various implementations, the beginnings of the waveforms are matched. In some cases, one or more features within the body of the replacement portion are matched to a corresponding feature in the original, as illustrated in FIG. 6, in which transients, such those indicated at 602 and 604 are aligned. The feature may correspond to a particular spoken word that is of importance, such that the timing of the utterance of that word in the replacement clips is to be accurately synchronized with that of the original track. In audio files that include a musical rendition of lyrics, the feature may correspond to the beginning of a sung lyrical phrase or verse, a particular consonant or vowel within the song, or other distinctive vocal feature of song that generates a distinctive waveform.

Synchronization between a replacement clip and the original portion that is being replaced may be extended to multiple features of the waveforms. This is achieved by time-warping, a process in which the timing of audio is altered without a concomitant change in pitch. In one example, features of a replacement waveform may match those of the original towards the beginning of the segment, but lag towards the end. Time warping is used to accelerate the later parts of the clip to bring its waveform into alignment with that of the original. In another example, one or more transient features of a replacement clip are aligned with corresponding features of the original clip using time warping. The overall duration of the replacement clip is then matched to that of the original by trimming one or both of the replacement clip boundaries, and/or time warping the edge portions of the clip as well.

Fine tuning the waveform timings of the replacement clip to match the original as closely as possible is useful in audio production workflows to improve the synchronization between various vocal tracks and backing tracks that have been recorded at different times. In video post-production workflows, especially those that involve automatic dialog replacement (ADR) when the audio is not recorded live on the set, such fine tuning may improve the accuracy of lip synchronization. In music workflows, it is important to maintain timing of word harmonies and enunciations to avoid backup vocals starting or ending their syllables at different times. Accurate alignment helps a recording to sound professional.

Matching of the properties of a replacement clip with those of the original may include gain matching. An average gain, peak gain, or gain of a particular feature may be matched, and/or gain may be matched dynamically at a granularity of individual words or even syllables within a word.

When the preferred alternate portion has been aligned, and optionally stretched and gain-adjusted, the problematic portion of the original (guide track) portion is replaced 118 with the aligned preferred replacement following optional time stretching and gain matching.

The methods described herein may be useful in several media production workflows, such as filming with field recorders, automatic dialog replacement, and music production. Field recorders are used for on-set recordings during shooting of a picture. These generate multi-channel recordings that are captured at the same time as the picture for any given take. Editors may only wish to use the recordings captured during the same take, but in some circumstances the timecode metadata on the recordings is inaccurate or missing. In this situation, phonetic matching may be used to find portions for replacing a recording from one field recorder to that of alternate one. Since the recordings are from the same take, the waveforms of the phonetically identified replacement portion(s) may be synchronized without additional gain modification or time stretching. Should an editor wish to search for content in another take, the editor may widen their metadata matching criteria so as not to restrict searching to the given take, and to allow the waveform synchronization/alignment step to include gain matching and/or time stretching since the timings of a second take will not coincide exactly with those of the original. When a speaker is shown in the picture, time stretching would facilitate improved alignment of mouth movements with spoken dialog.

ADR involves the re-recording of an actor's dialog in a controlled environment after the initial production is shot. The need for ADR arises when the production audio does not have the quality that is needed for the final mix. Phonetic matching between the production audio and one or more re-recording channels may be used to locate the replacement portions. Since the takes are different, editors may wish to add automatic time stretching to match the timing of the re-recording to the timing of the on-set take.

In music production workflows, vocal harmonies are often doubled in various music productions. When editors wish to replace one of the vocals, phonetic matching may be used to locate the corresponding portions to be used for replacement. After previewing the candidate replacements and selecting a preferred replacement portion, the system automatically aligns the replacement to the original, and, as specified by the editor, optionally using waveform time-stretching and gain-matching to improve the matching with the other vocal parts.

Figure 7:
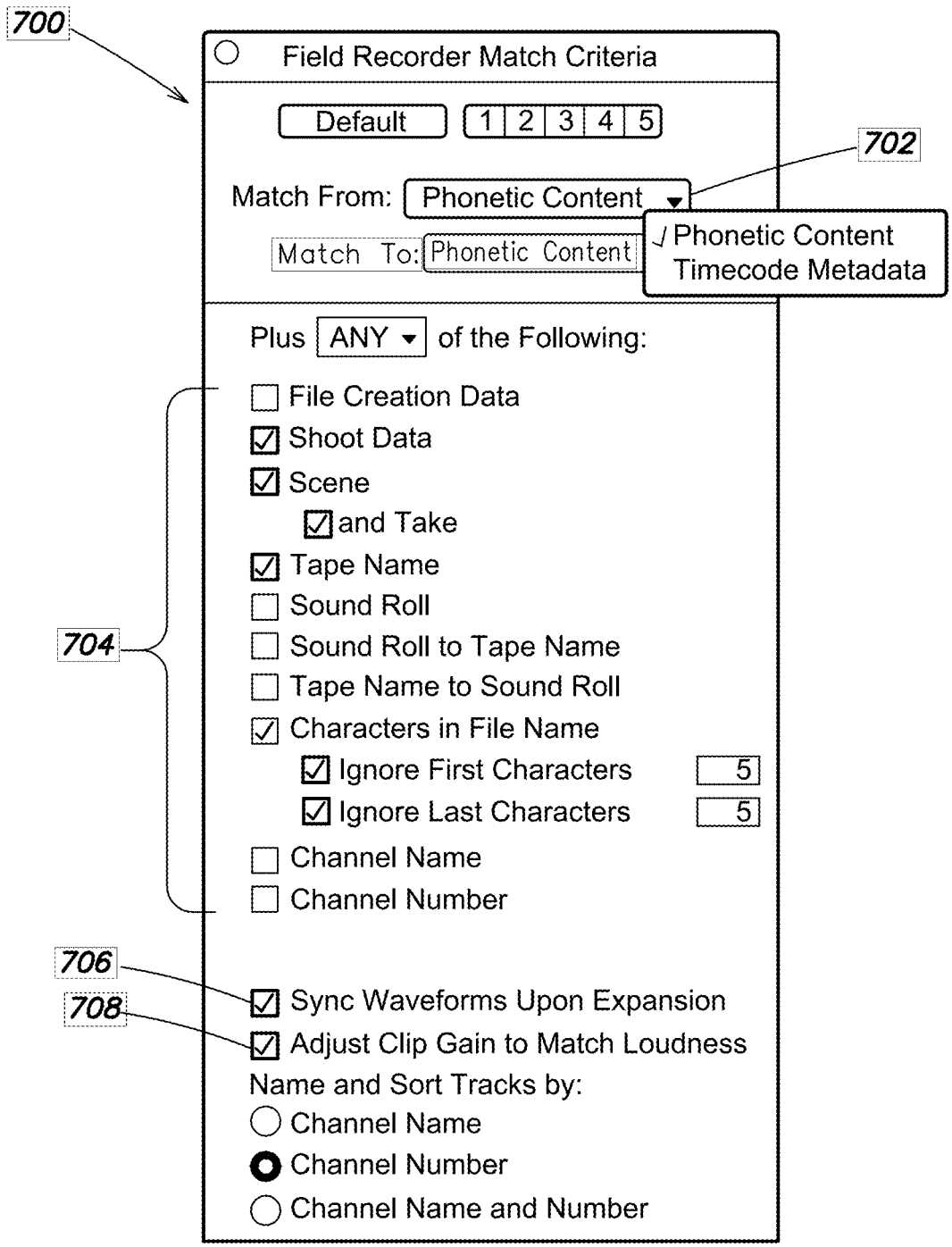
FIG. 7 is a diagrammatic screenshot of automatic search options presented to a user of a digital audio workstation with phonetic matching capabilities.

In various implementations, each of the steps that are to be included in the automatic replacement process are pre-selectable user options. FIG. 7 illustrates exemplary window 700 of a user interface of a phonetically enabled DAW that integrates user-selectable options for automated search and replacement of dialog in an audio track. The user is able to specify how candidate alternate content is to be located as shown in selection box 702, where the user may opt to search alternate files by timecode or by phonetic content matching. In timecode matching, the application selects portions of the available files having timecode ranges that match those of the portion to be replaced. Phonetic searching by contrast, identifies portions having phoneme sequences matching those of the portion to be replaced. The candidates returned by the searching may be filtered by specifying one or more metadata attributes such as shoot date, scene, take, roll, etc., that should match the original, as shown in checkboxes 704. The user is also able to specify how the candidate clips that match the specified attributes are treated. They may be synchronized to the original by waveform matching as shown in checkbox 706. The user is also able to add gain-matching to match the loudness of the replacement candidate with that of the original, as shown at 708.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk, tape, or solid state media including flash memory. Audio output devices connected to the computer system may include loudspeakers and headphones. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of editing an audio composition using an audio editing application, the method comprising:
   receiving a first audio file that includes a recorded first take of at least one of spoken dialog and song, wherein the first audio file is indexed by a first phonetic index comprising an ordered list of phonemes, each of the phonemes being associated with a temporal offset within the first audio file at which the phoneme occurs in the at least one of spoken dialog and song;
   receiving a second audio file that includes a recorded second take of the at least one of spoken dialog and song, wherein the second audio file is indexed by a second phonetic index comprising an ordered list of phonemes, each of the phonemes being associated with a temporal offset within the second audio file at which the phoneme occurs in the at least one of spoken dialog and song; and
   in response to a user of the audio editing application specifying a portion of the first audio file that is to be replaced, the audio editing application automatically:
   using the first phonetic index to identify a phoneme sequence corresponding to the specified portion of the first audio file;
   searching the second phonetic index for an occurrence of the phoneme sequence in the second phonetic index; and
   in response to locating an occurrence of the phoneme sequence in the second phonetic index:
      identifying a matching portion of the second audio file corresponding to the located occurrence of the phoneme sequence; and
      in response to the user of the audio editing application selecting the matching portion of the second audio file:
         temporally aligning the matching portion of the second audio file with the specified portion of the first audio file by matching a waveform of the matching portion of the second audio file with a waveform of the specified portion of the first audio file; and
         replacing the specified portion of the first audio file with the temporally aligned matching portion of the second audio file.

2. The method of claim 1, wherein matching the waveform of the matching portion of the second audio file with the waveform of the specified portion of the first audio file includes time-stretching the waveform of the matching portion of the second audio file.

3. The method of claim 1, wherein matching the waveform of the matching portion of the second audio file with the waveform of the specified portion of the first audio file includes adjusting a gain of the waveform of the matching portion of the second audio file.

4. The method of claim 1, wherein the first recording was captured on a film set and the second recording was captured in a recording studio.

5. The method of claim 1 further comprising automatically aligning the matching portion of the second audio file with the specified portion of the first audio file by adjusting a temporal offset of the matching portion of the second track so that a feature of a waveform of the matching portion of the second audio track is aligned with a corresponding feature of a waveform of the specified portion of the first audio file.

6. The method of claim 5, wherein the feature of the waveform corresponds to a beginning of an utterance.

7. The method of claim 5, wherein the feature of the waveform corresponds to a beginning of sung phrase.

8. The method of claim 1, further comprising automatically stretching or shrinking at least a part of the matching portion of the second audio file so as to temporally align a plurality of features of a waveform of the matching portion with a corresponding plurality of features of a waveform of the specified portion of the first audio file.

9. A method of editing an audio composition using an audio editing application, the method comprising:
   receiving a first audio file that includes a recording of at least one of spoken dialog and song;
   receiving a second audio file that includes an alternate recording of the at least one of spoken dialog and song, wherein the second audio file is indexed by a phonetic index comprising an ordered list of phonemes, each of the phonemes being associated with a temporal offset within the second audio file at which the phoneme occurs in the at least one of spoken dialog and song; and
   in response to a user of the audio editing application specifying a text string representing speech contained within a portion of the first audio file that is to be replaced, the audio editing application automatically:
   converting the text string into a corresponding phoneme sequence;
   searching the phonetic index of the second audio file for an occurrence of the phoneme sequence; and
   in response to locating an occurrence of the phoneme sequence in the phonetic index:
      identifying a matching portion of the second audio file corresponding to the located occurrence of the phoneme sequence; and
      in response to the user of the audio editing application selecting the matching portion of the second audio file:
         enabling the user to align the matching portion of the second audio file with the portion of the first audio file that is to be replaced; and replacing the portion of the first audio file that is to be replaced with the temporally aligned matching portion of the second audio file.

10. The method of claim 9, further comprising adjusting a gain of the matching portion of the second audio file to match a gain of the portion of the first audio file that is to be replaced.

11. The method of claim 9, wherein an average gain of the matching portion of the second audio file is matched to an average gain of the portion of the first audio file.

12. The method of claim 9, wherein a gain of a feature of a waveform of the second audio file is matched to a corresponding feature of a waveform of the first audio file.

13. A computer program product comprising:
a non-transitory computer-readable medium with computer-readable instructions encoded thereon, wherein the computer-readable instructions, when processed by a processing device instruct the processing device to perform a method of editing an audio composition using an audio editing application, the method comprising:
receiving a first audio file that includes a recorded first take of at least one of spoken dialog and song, wherein the first audio file is indexed by a first phonetic index comprising an ordered list of phonemes, each of the phonemes being associated with a temporal offset within the first audio file at which the phoneme occurs in the at least one of spoken dialog and song;
receiving a second audio file that includes a recorded second take of the at least one of spoken dialog and song, wherein the second audio file is indexed by a second phonetic index comprising an ordered list of phonemes, each of the phonemes being associated with a temporal offset within the second audio file at which the phoneme occurs in the at least one of spoken dialog and song; and
in response to a user of the audio editing application specifying a portion of the first audio file that is to be replaced, the audio editing application automatically:
using the first phonetic index to identify a phoneme sequence corresponding to the specified portion of the first audio file;
searching the second phonetic index for an occurrence of the phoneme sequence in the second phonetic index; and
in response to locating an occurrence of the phoneme sequence in the second phonetic index:
identifying a matching portion of the second audio file corresponding to the located occurrence of the phoneme sequence; and
in response to the user of the audio editing application selecting the matching portion of the second audio file:
temporally aligning the matching portion of the second audio file with the specified portion of the first audio file by matching a waveform of the matching portion of the second audio file with a waveform of the specified portion of the first audio file; and
replacing the specified portion of the first audio file with the temporally aligned matching portion of the second audio file.

14. A method of editing an audio composition using an audio editing application, the method comprising:
receiving a first audio file that includes a first recording of audio content captured by a first recorder, wherein the first audio file is indexed by a first phonetic index comprising an ordered list of phonemes, each of the phonemes being associated with a temporal offset within the first audio file at which the phoneme occurs in the audio content;
receiving a second audio file that includes a second recording of the audio content captured by a second recorder simultaneously with the capture of the audio content by the first recording, wherein the second audio file is indexed by a second phonetic index comprising an ordered list of phonemes, each of the phonemes being associated with a temporal offset within the second audio file at which the phoneme occurs in the audio content; and
in response to a user of the audio editing application specifying a portion of the first audio file that is to be replaced, the audio editing application automatically:
using the first phonetic index to identify a phoneme sequence corresponding to the specified portion of the first audio file;
searching the second phonetic index for an occurrence of the phoneme sequence in the second phonetic index; and
in response to locating an occurrence of the phoneme sequence in the second phonetic index:
identifying a matching portion of the second audio file corresponding to the located occurrence of the phoneme sequence; and
in response to the user of the audio editing application selecting the matching portion of the second audio file:
temporally aligning the matching portion of the second audio file with the specified portion of the first audio file by matching a waveform of the matching portion of the second audio file with a waveform of the specified portion of the first audio file; and
replacing the specified portion of the first audio file with the temporally aligned matching portion of the second audio file.

15. The method of claim 14, wherein the first recorder and second recorders are field recorders, and the first recording and the second recording were captured on-set during the shooting of a picture.

16. The method of claim 14, wherein the first recorder is located at a first location, and the second recorder is located at a second location different from the first location.

* * * * *